(12) United States Patent
Malheurty et al.

(10) Patent No.: US 12,071,506 B2
(45) Date of Patent: Aug. 27, 2024

(54) ELECTRICAL DEVICE COMPRISING A CROSS-LINKED LAYER

(71) Applicant: NEXANS, Courbevoie (FR)

(72) Inventors: Laureene Malheurty, Macon (FR); Didier Billemaz, Nievroz (FR); My Hanh Linda Nguyen, Lyons (FR)

(73) Assignee: NEXANS, Courbevoie (FR)

( * ) Notice: Subject to any disclaimer, the term of this patent is extended or adjusted under 35 U.S.C. 154(b) by 320 days.

(21) Appl. No.: 16/892,258

(22) Filed: Jun. 3, 2020

(65) Prior Publication Data
US 2020/0399421 A1 Dec. 24, 2020

(30) Foreign Application Priority Data
Jun. 4, 2019 (FR) .................................... 19 05929

(51) Int. Cl.
| | |
|---|---|
| *C08G 59/50* | (2006.01) |
| *C08G 59/58* | (2006.01) |
| *C08L 63/00* | (2006.01) |
| *H01B 3/40* | (2006.01) |
| *H01B 13/14* | (2006.01) |

(52) U.S. Cl.
CPC ......... *C08G 59/5073* (2013.01); *C08G 59/58* (2013.01); *C08L 63/00* (2013.01); *H01B 3/40* (2013.01); *H01B 13/148* (2013.01); *C08L 2201/02* (2013.01); *C08L 2203/202* (2013.01)

(58) Field of Classification Search
None
See application file for complete search history.

(56) References Cited

U.S. PATENT DOCUMENTS

| | | |
|---|---|---|
| 2011/0313103 A1 | 12/2011 | Swiatkowski |
| 2013/0220666 A1 | 8/2013 | Fagrell |
| | (Continued) | |

OTHER PUBLICATIONS

International Search Report dated Apr. 29, 2020.

*Primary Examiner* — Megan McCulley
(74) *Attorney, Agent, or Firm* — Sofer & Haroun, LLP

(57) ABSTRACT

An electrical device includes at least one cross-linked layer obtained from a polymer composition that has:
at least one polymer comprising one or more epoxy function(s), and
at least one cross-linking agent. The cross-linking agent is selected from:
a non-aromatic cyclic amine,
an imidazole of formula (I)

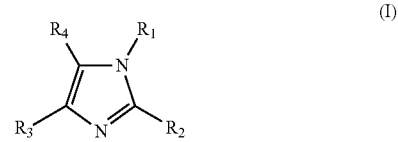

(I)

where $R_1$ and $R_2$ independently represent a hydrogen atom or a hydrocarbon group, $R_3$ and $R_4$ independently represent a hydrogen atom or a hydrocarbon group, or $R_3$ and $R_4$ form, together with the carbon atoms of the imidazole ring to which they are attached, a ring, with the imidazole being associated with a cross-linking co-agent having at least one reactive function capable of reacting with the epoxy function of said polymer, and, a mixture thereof.

13 Claims, 2 Drawing Sheets

(56) References Cited

U.S. PATENT DOCUMENTS

| | | | |
|---|---|---|---|
| 2014/0329091 A1 | 11/2014 | Cogen et al. | |
| 2016/0297951 A1* | 10/2016 | Kumano | C08G 63/00 |
| 2017/0047142 A1* | 2/2017 | Disson | C08G 59/4238 |
| 2018/0112096 A1* | 4/2018 | Shimada | H01B 7/0045 |
| 2018/0268956 A1* | 9/2018 | Shimada | H01B 3/44 |
| 2019/0371489 A1 | 12/2019 | Ahn et al. | |

* cited by examiner

ELECTRICAL DEVICE COMPRISING A CROSS-LINKED LAYER

This application claims the benefit of priority from French Patent Application No. 19 05929, filed on Jun. 4, 2019, the entirety of which is incorporated by reference.

BACKGROUND

Field of the Invention

The present invention relates to an electrical device, in particular of the electrical cable or electrical cable accessory type. It typically, but not exclusively, applies to the fields of low-voltage (in particular less than 6 kV), medium-voltage (in particular from 6 to 45-60 kV) or high-voltage (in particular greater than 60 kV, and up to 800 kV) power cables, whether direct or alternating current.

Description of the Related Art

Electrical cables can typically consist of a central electrical conductor and at least one peroxide-cross-linked electrically insulating layer. The peroxide route is increasingly being avoided in relation to the decomposition products of peroxide, with disadvantages during cable manufacture and even after the cable is in an operational configuration. Indeed, during cross-linking, peroxides decompose and form cross-linking by-products such as, in particular, methane, acetophenone, cumyl alcohol, acetone, tertiary butanol, alpha-methyl styrene and/or water. The formation of water from cumyl alcohol is relatively slow and can occur after several months or even years once the cable is in an operational configuration. This significantly increases the risk of breakdown of the cross-linked layers. In addition, if the methane formed during the cross-linking step is not evacuated from the cross-linked layers, risks related to the explosive nature of the methane and its ability to ignite must not be ignored. This gas can also cause damage once the cable is put into service. Even if solutions exist to limit the presence of methane within the cable, such as for example treating the cable thermally to accelerate the diffusion of methane outside the cable, they become time-consuming and costly when the thickness of the cross-linked layers is significant.

The document US-4 826 726 is known which describes a heat-resistant electrical conductor surrounded by a cross-linked layer obtained from a composition comprising an ethylenic copolymer comprising an oxirane function, and a polymeric compound as cross-linking agent, of the ethylene and unsaturated dicarboxylic acid anhydride copolymer type.

OBJECTS AND SUMMARY

The aim of the present invention is to overcome the disadvantages of the prior art techniques by providing an electrical device, in particular of the electrical cable or electrical cable accessory type, comprising at least one cross-linked layer whose manufacture significantly limits the presence of cross-linking by-products, such as for example methane and/or water, while guaranteeing an optimum cross-linking speed and density.

The present invention relates to an electrical device comprising at least one cross-linked layer obtained from a polymer composition comprising at least one polymer comprising one or more epoxy functions, and at least one cross-linking agent, characterized in that the cross-linking agent is selected from:
a non-aromatic cyclic amine,
an imidazole of formula (I):

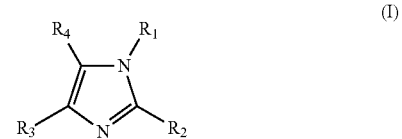

wherein $R_1$ and $R_2$ independently represent a hydrogen atom or a hydrocarbon group, $R_3$ and $R_4$ independently represent a hydrogen atom or a hydrocarbon group, or $R_3$ and $R_4$ form, together with the carbon atoms of the imidazole ring to which they are attached, a ring, said imidazole being associated with a cross-linking co-agent comprising at least one reactive function capable of reacting with the epoxy function of said polymer, and preferably at least two reactive functions capable of reacting with the epoxy functions of said polymer, and
a mixture thereof.

Preferably, $R_1$ and $R_2$ cannot both be hydrogen atoms: in other words, when $R_1$ is a hydrogen atom, $R_2$ is a hydrocarbon group, and when $R_2$ is a hydrogen atom, $R_1$ is a hydrocarbon group.

Particularly preferably, $R_1$ and $R_2$ independently represent a hydrocarbon group.

Thanks to the invention, the cross-linked layer makes it possible to avoid the use of organic peroxide, while improving the cross-linking time and/or the cross-linking density.

In addition, the cross-linked layer of the invention has the advantage of being economical, easy to implement, in particular by extrusion, and easy to manufacture, since it does not require the use of restrictive degassing processes.

The Cross-Linking Agent

In a first embodiment, the cross-linking agent is a non-aromatic cyclic amine, and preferably a saturated non-aromatic cyclic amine. "Saturated" means a non-aromatic cyclic amine containing no unsaturation, in particular of the carbon-carbon double bond or carbon-carbon triple bond type.

Said non-aromatic cyclic amine may comprise one or more amine functions, which may be of the primary or secondary amine type.

Preferably, the cross-linking agent of this first embodiment may be a non-aromatic cyclic diamine, and particularly preferably a saturated non-aromatic cyclic diamine.

Examples of cross-linking agent used in this first embodiment include 1,4-diazabicyclo[2.2.2]octane (DABCO), 1,5-diazabicyclo[4.3.0]non-5-ene (or DBN), or 1,8-diazabicyclo[5.4.0]undec-7-ene (DBU).

The non-aromatic cyclic amine may also be combined with at least one imidazole of formula (I) and/or with at least one cross-linking co-agent comprising at least one reactive function capable of reacting with the epoxy function of said polymer, the imidazole of formula (I) and said cross-linking co-agent being as described below in the second embodiment. In other words, the polymer composition may comprise said non-aromatic cyclic amine, and optionally said imidazole of formula (I) and/or said cross-linking co-agent.

The polymer composition in accordance with the invention may comprise an amount of non-aromatic cyclic amine in an amount necessary and sufficient to obtain the cross-linked layer.

By way of example, the polymer composition in accordance with the invention may comprise at most 10.0 parts by weight of non-aromatic cyclic amine per 100 parts by weight of polymer(s) in the composition, preferably at most 5.0 parts by weight of non-aromatic cyclic amine per 100 parts by weight of polymer(s) in the composition, and preferably at most 2.0 parts by weight of non-aromatic cyclic amine per 100 parts by weight of polymer(s) in the composition. An amount greater than 10.0 parts by weight could induce roasting of the polymer composition during its processing, or in other words induce early cross-linking of the polymer composition during its processing, in particular by extrusion, thus forming surface defects at the extruder outlet.

The polymer composition according to the invention may comprise at least 0.01 parts by weight of non-aromatic cyclic amine per 100 parts by weight of polymer(s) in the composition, and preferably at least 0.05 parts by weight of non-aromatic cyclic amine per 100 parts by weight of polymer(s) in the composition.

In a second embodiment, the cross-linking agent is an imidazole of formula (I):

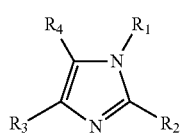

(I)

wherein
R$_1$ represents a hydrogen atom or a hydrocarbon group,
R$_2$ represents a hydrogen atom or a hydrocarbon group, identical to or different from R$_2$,
R$_3$ represents a hydrogen atom or a hydrocarbon group, and
R$_4$ represents a hydrogen atom or a hydrocarbon group, identical to or different from R$_3$.
R$_3$ and R$_4$ can form, together with the carbon atoms of the imidazole ring to which they are attached, a ring.

More particularly, in formula (I) of the imidazole according to the invention:
R$_1$ represents a hydrogen atom, or an alkyl group having from 1 to 20 carbon atoms, a cycloalkyl group having from 5 to 24 carbon atoms, an aryl group having from 6 to 30 carbon atoms or an aralkyl group having from 7 to 25 carbon atoms; which group may optionally be interrupted by one or more heteroatoms and/or substituted;
R$_2$ represents a hydrogen atom, or an alkyl group having from 1 to 20 carbon atoms, a cycloalkyl group having from 5 to 24 carbon atoms, an aryl group having from 6 to 30 carbon atoms or an aralkyl group having from 7 to 25 carbon atoms; which group may optionally be interrupted by one or more heteroatoms and/or substituted;
R$_3$ and R$_4$ independently represent identical or different groups selected from a hydrogen atom or alkyl groups having from 1 to 20 carbon atoms, cycloalkyl groups having from 5 to 24 carbon atoms, aryl groups having from 6 to 30 carbon atoms or aralkyl groups having from 7 to 25 carbon atoms; which groups may optionally be interrupted by heteroatoms and/or substituted.
R$_3$ and R$_4$ can form, together with the carbon atoms of the imidazole ring to which they are attached, a ring selected from aromatic, heteroaromatic or aliphatic rings comprising from 5 to 12 carbon atoms, preferably 5 or 6 carbon atoms.

Preferably, R$_1$ and R$_2$ cannot both be hydrogen atoms: in other words, when R$_1$ is a hydrogen atom, R$_2$ is a hydrocarbon group, and when R$_2$ is a hydrogen atom, R$_1$ is a hydrocarbon group, and preferably R$_1$ and R$_2$ independently represent a hydrocarbon group.

Particularly preferably, in formula (I) of the imidazole according to the invention:
R$_1$ represents an alkyl group having from 1 to 20 carbon atoms;
R$_2$ represents an alkyl group having from 1 to 20 carbon atoms; and
R$_3$ and R$_4$ represent hydrogen atoms.

The imidazole of formula (I) of the invention may be for example selected from 1,2-dimethylimidazole, 1-methylimidazole, 2-methylimidazole, 1-(2-cyanoethyl)-2-methylimidazole, and 2-ethyl-4-methylimidazole.

Said imidazole of formula (I) may advantageously be associated with a cross-linking co-agent comprising at least one reactive function capable of reacting with the epoxy function of said polymer, and preferably at least two reactive functions capable of reacting with the epoxy functions of said polymer, said reactive functions being able to be identical or different. In other words, the polymer composition may comprise said imidazole and said cross-linking co-agent.

Said imidazole and said cross-linking co-agent can further be associated with at least one non-aromatic cyclic amine as described above in the first embodiment. In other words, the polymer composition may comprise said imidazole, said cross-linking co-agent, and optionally said non-aromatic cyclic amine.

The cross-linking co-agent of the invention may be a polymeric compound or a non-polymeric compound. Preferably, the cross-linking agent is different from the polymer comprising one or more epoxy function(s).

When the cross-linking co-agent is a polymeric compound, said cross-linking co-agent can be preferably a polyethylene glycol, for example a polyethylene glycol diacid.

When the cross-linking co-agent of the invention is of the "non-polymeric" type, it is not derived from the covalent linking of a large number of identical or different monomer units, and preferably it is not derived from the covalent linking of at least two identical or different monomer units.

The cross-linking co-agent comprises at least one reactive function which may be selected from an anhydride function, a carboxyl function and an amine function.

Preferably, the cross-linking co-agent can comprise at least two reactive functions, identical or different, capable of reacting with the epoxy functions of said polymer, these reactive functions being selected indifferently from an anhydride function, a carboxyl function and an amine function.

The reactive function of the cross-linking co-agent is more particularly capable of reacting with the epoxy function of said polymer to allow the cross-linking of said polymer. In particular, it will react with the epoxy function during a rise in temperature causing the epoxy to open.

The cross-linking co-agent may preferably comprise:
at least one amine function and at least one carboxyl function, or
several carboxyl functions.

In a particularly preferred embodiment, the cross-linking co-agent may be selected from an amino acid, a carboxylic acid, an anhydride, and a mixture thereof.

The amino acid typically comprises two functions: a carboxyl function —COOH, and an amine function which is preferably of the primary amine —NH$_2$ type. The carbon chain separating the carboxyl function from the amine function may comprise one or more carbon atoms, preferably from 1 to 50 carbon atoms, and preferably from 1 to 20 carbon atoms. The carbon chain may be branched. One or more heteroatoms may be present on the carbon chain at regular or irregular intervals. Preferentially, these heteroatoms are oxygen or nitrogen atoms, the nitrogen atom being able to be substituted or unsubstituted. Classically, the carboxyl and amine functions may be positioned at the ends of the main carbon chain of said amino acid, the main carbon chain preferably being an unbranched chain. The amino acid can also be an alpha-amino acid defined by the fact that the amine function is linked to the carbon atom adjacent to the carboxyl function (the alpha carbon).

The amino acid may be for example 11-aminoundecanoic acid, 6-aminohexanoic acid, or an amino-polyethyleneglycol acid such as for example alpha-amino-24(ethylene glycol)-omega-propionic acid.

The carboxylic acid may be an organic compound containing one or more carboxyl functions, in polymeric or non-polymeric form.

The carboxylic acid may be for example selected from dicarboxylic acids, polyethylene glycol diacids, copolymers of olefin and unsaturated dicarboxylic acid, copolymers of olefin and unsaturated monocarboxylic acid.

The carboxylic diacid may be in non-polymeric form and may be, for example the dodecanedioic acid.

The anhydride (or acid anhydride) may be an organic compound comprising at least one anhydride function. It may also comprise an aliphatic chain comprising at least 5 carbon atoms, this chain being able to be saturated or unsaturated, may or may not comprise heteroatoms.

By way of example, the anhydride may be selected from alkenyl succinic anhydrides, copolymers of olefin and unsaturated dicarboxylic acid anhydride, maleic anhydride, and phthalic anhydride.

According to a preferred embodiment, the non-aromatic cyclic amine may be associated to at least one cross-linking co-agent comprising at least two reactive functions capable of reacting with the epoxy function of the polymer, said at least one cross-linking co-agent being chosen among an amino acid as previously described, a carboxylic diacid, an organic compound in form of a polymer comprising at least two carboxylic functions, and one of their mixtures. According to this embodiment, the non-aromatic cyclic amine may not be associated with an imidazole of formula (I).

The polymer composition in accordance with the invention may comprise an amount of imidazole of formula (I) and/or cross-linking co-agent in an amount necessary and sufficient to obtain the cross-linked layer.

By way of example, the polymer composition in accordance with the invention may comprise at most 15.0 parts by weight of imidazole of formula (I) per 100 parts by weight of polymer(s) in the composition, preferably at most 10.0 parts by weight of imidazole of formula (I) per 100 parts by weight of polymer(s) in the composition, and preferably at most 5.0 parts by weight of imidazole of formula (I) per 100 parts by weight of polymer(s) in the composition. An amount greater than 15.0 parts by weight could induce roasting of the polymer composition during its processing.

The polymer composition according to the invention may comprise at least 0.1 parts by weight of imidazole of formula (I) per 100 parts by weight of polymer(s) in the composition, and preferably at least 0.5 parts by weight of imidazole of formula (I) per 100 parts by weight of polymer(s) in the composition.

By way of example, the polymer composition in accordance with the invention may comprise at most 15.0 parts by weight of cross-linking co-agent per 100 parts by weight of polymer(s) in the composition, preferably at most 10.0 parts by weight of cross-linking co-agent per 100 parts by weight of polymer(s) in the composition, and preferably at most 5.0 parts by weight of cross-linking co-agent per 100 parts by weight of polymer(s) in the composition. An amount greater than 15.0 parts by weight could not only induce a relatively long t90 according to the standard ISO 6502 (2018), in particular a t90 of at least 30 minutes, but also a reversion inducing a rearrangement of the cross-linking network.

The polymer composition in accordance with the invention may comprise at least 0.1 parts by weight of cross-linking co-agent per 100 parts by weight of polymer(s) in the composition, and preferably at least 0.5 parts by weight of cross-linking co-agent per 100 parts by weight of polymer(s) in the composition. An amount less than 0.1 parts by weight could limit the cross-linking density.

In the present invention, the expression "100 parts by weight of polymer(s)" preferentially means the polymer(s) different from the cross-linking co-agent in the polymer composition, when the cross-linking co-agent is in the form of a polymer.

In a third embodiment, the first embodiment and the second embodiment may be combined.

The Polymer Comprising One or More Epoxy Function(s)

The polymer comprising one or more epoxy function(s) of the invention is referred to as "polymer P" in the remainder of the description.

The epoxy function (i.e. epoxide function) of the polymer P is more particularly an oxirane function (i.e. an ethylene oxide group).

Preferably, the epoxy function may be provided by a compound comprising said epoxy function, this compound being able to be selected from glycidyl esters. Thus, the polymer of the invention can comprise glycidyl ester groups.

The polymer P of the invention may comprise at most 50 wt % of epoxy function, preferably at most 10 wt % of epoxy function, and preferably at most 5 wt % of epoxy function.

The polymer P of the invention may comprise at least 0.1 wt % of epoxy function, and preferably at least 0.5 wt % of epoxy function.

According to a first variant, the epoxy function of the polymer P may be grafted onto said polymer. The polymer comprising at least one epoxy function of the invention is, according to this first variant, an epoxy graft polymer. In other words, the polymer according to the invention may be a polymer comprising at least one epoxy function grafted onto the macromolecular chain (i.e. main chain or backbone) of said polymer. The ends of the macromolecular chain of the polymer, in turn, may or may not be grafted with the epoxy function.

According to a second variant, the polymer comprising at least one epoxy function of the invention may be a copolymer obtained from at least two monomers, one of the two monomers comprising said epoxy function. Said monomer comprising said epoxy function may be selected from the following compounds: butenecarboxylic acid monoglycidyl ester, glycidyl methacrylate, glycidyl acrylate, methylglycidyl acrylate, methylglycidyl methacrylate, itaconic acid glycidyl ester, 7,8-epoxy-1-octyl methacrylate, itaconic acid methylglycidyl ester, 7,8-epoxy-1-octyl vinyl ether, vinyl glycidyl ether, allyl glycidyl ether and 2-methyl-2-propenyl glycidyl ether.

The polymer P of the invention is more particularly an organic polymer, which may or may not be of the elastomeric type, making it possible in particular to shape the polymer composition by extrusion.

The polymer P may comprise at least one polyolefin. The term "polyolefin" as such generally means an olefin polymer of the olefin homopolymer or copolymer type. Preferably, said olefin polymer is a non-cyclic olefin polymer.

In the present invention, it will be preferred to use an ethylene polymer (homo- or copolymer of ethylene) or a propylene polymer (homo- or copolymer of propylene).

According to a first variant of the invention, the polymer P may be an epoxy grafted olefin homopolymer or an epoxy grafted olefin copolymer.

According to a second variant of the invention, the polymer P may be a copolymer, obtained from at least one olefin monomer, preferably ethylene, and a monomer comprising at least one epoxy function, as described above.

In a particular embodiment, the polymer of the invention may further comprise one or more functions which advantageously make said polymer more polar in order to give it other properties of use, namely for example better resistance to oils and greater softness or flexibility. By way of example, the polymer P may comprise at least one acrylate function and/or at least one vinyl acetate function.

Particularly advantageously, the constituent polymer(s) of the polymer composition of the invention may be solely one or more olefin-based polymer(s), or in other words the constituent polymer(s) of the polymer composition of the invention may be solely one or more polymers obtained from one or more olefin monomer(s) (i.e. olefin homopolymer and/or copolymer).

The polymer P of the invention may be, more particularly, a copolymer obtained by copolymerization from:
one or more olefin monomer(s), preferably of the ethylene and/or propylene type,
a monomer comprising at least one epoxy function,
optionally, one or more monomer(s) selected independently from a monomer comprising at least one acrylate function and a monomer comprising at least one vinyl acetate function.

By way of example, the polymer P of the invention may be selected from:
a copolymer of ethylene and glycidyl methacrylate,
a copolymer of ethylene, vinyl acetate, an acrylate, and a monomer comprising at least one epoxy function,
a copolymer of ethylene, propylene and diene monomer (commonly known as EPDM), copolymerized with a monomer comprising at least one epoxy function. The diene monomer may be selected from ethylene norbornene (ENB), vinyl norbornene (VNB), dicyclopentadiene (DCPD), and
a copolymer of ethylene and propylene, copolymerized with a monomer comprising at least one epoxy function.

The polymer composition of the invention may comprise more than 50.0 parts by weight of polymer P, preferably at least 70 parts by weight of polymer P, and preferably at least 90 parts by weight of polymer P, per 100 parts by weight of polymer(s) in the polymer composition.

In the present invention, the expression "100 parts by weight of polymer(s)" preferentially means the polymer(s) different from the cross-linking co-agent in the polymer composition, when the cross-linking co-agent is in the form of a polymer.

Filler(s)

The polymer composition of the invention may further comprise one or more filler(s).

The filler of the invention may be a mineral or organic filler. It may be selected from a flame-retardant filler and an inert (or non-combustible) filler.

By way of example, the fire-retardant filler may be a hydrated filler, selected in particular from metal hydroxides such as for example magnesium dihydroxide (MDH) or aluminium trihydroxide (ATH). These flame-retardant fillers act mainly by physical means by decomposing endothermically (e.g. releasing water), which has the effect of lowering the temperature of the cross-linked layer and limiting the propagation of flames along the electrical device. These are in particular flame retardant properties.

The inert filler may be, for its part, chalk, talc, clay (e.g. kaolin), carbon black, or carbon nanotubes.

According to a first variant, carbon black, as an electrically conductive filler, may be preferred to obtain a semiconducting cross-linked layer, and may be introduced into the polymer composition in an amount sufficient to make the composition semiconducting.

In a second variant, carbon black may be used in a small amount to improve the dielectric properties of an electrically insulating layer.

The polymer composition may comprise at least 5 parts by weight of filler per 100 parts by weight of polymer in the polymer composition, preferably at least 10 parts by weight of filler per 100 parts by weight of polymer in the polymer composition, preferably at least 20 parts by weight of filler per 100 parts by weight of polymer in the polymer composition, and even more preferentially at least 50 parts by weight of filler per 100 parts by weight of polymer in the polymer composition.

The addition of a filler as described in the invention may lead to an increase in temperature during the processing of the polymer composition, thereby inducing premature cross-linking of the polymer composition. Thus, in order to avoid any premature cross-linking of the polymer composition, it is preferable that the addition of the filler is carried out in such a way that there is no premature cross-linking of the polymer composition during its processing. More particularly, the cross-linking agent may advantageously be added to the polymer composition in a separate step subsequent to the addition of the filler.

According to another feature of the invention, and in order to guarantee a so-called halogen-free flame retardant (HFFR) electrical device, the electrical device, or in other words the elements that make up said electrical device, preferably does/do not contain halogenated compounds. These halogenated compounds may be of any kind, such as for example fluorinated polymers or chlorinated polymers such as polyvinyl chloride (PVC), halogenated plasticizers, halogenated mineral fillers, etc.

Additive(s)

The polymer composition may typically further comprise additives in an amount of 0.1 to 20 wt % based on the total weight of the polymer composition.

The additives are well known to the skilled person and may be selected for example from:
protective agents, such as antioxidants, UV inhibitors, copper inhibitors, water-tree inhibitors,
processing agents, such as plasticizers, lubricants, oils, compatibilizers,
coupling agents,
roasting retardants,
pigments or dyes, and
a mixture thereof.

More particularly, antioxidants help protect the composition from thermal stresses generated during the manufacturing or operating stages of the device.

The antioxidants are preferably selected from:
- sterically hindered phenolic antioxidants such as tetrakismethylene(3,5-di-t-butyl-4-hydroxyhydrocinnamate)methane, octadecyl 3-(3,5-di-t-butyl-4-hydroxyphenyl) propionate, 2,2'-thiodiethylene bis[3-(3,5-di-t-butyl-4-hydroxyphenyl)propionate], 2,2'-thiobis(6-t-butyl-4-methylphenol), 2,2'-methylenebis(6-t-butyl-4-methylphenol), 1,2-bis(3,5-di-t-butyl-4-hydroxyhydrocinnamoyl)hydrazine, and 2,2'-oxamidobis[ethyl 3(3,5-di-t-butyl-4-hydroxyphenyl) propionate];
- thioethers such as 4,6-bis(octylthiomethyl)-o-cresol, bis [2-methyl-4-{3-n-alkyl (C12 or C14)thiopropionyloxy}-5-t-butylphenyl]sulfide and thiobis-[2-t-butyl-5-methyl-4,1-phenylene]bis[3-(dodecyltio)propionate];
- sulfur-based antioxidants such as dioctadecyl-3,3'-thiodipropionate or didodecyl-3,3'-thiodipropionate;
- phosphorus-based antioxidants such as phosphites or phosphonates such as for example tris(2,4-di-t-butylphenyl)phosphite or bis(2,4-di-t-butylphenyl)pentaerythritol diphosphite; and
- amine-type antioxidants such as phenylenediamines (IPPD, 6PPD, etc.), styrenated diphenylamines, diphenylamines, mercapto benzimidazoles and polymerized 2,2,4-trimethyl-1,2 dihydroquinoline (TMQ).

The type of stabilizer and its content in the polymer composition of the invention may be selected as a function of the maximum temperature to which the polymers are exposed during the production of the mixture and during their processing, in particular by extrusion, and as a function of the maximum duration of exposure to this temperature.

The Cross-Linked Layer and the Electrical Device

In the present invention, the cross-linked layer may be easily characterized by determining the cross-linking density given by the measured value of $M_H-M_L$ according to the standard ISO 6502 (2018) with a moving die rheometer (MDR). This value is expressed in dN·m and represents the difference in torque measured by the moving die before and after complete formation of the cross-linking network.

More particularly, said cross-linked layer may advantageously have an $M_H-M_L$ value of at least 2.0, preferably at least 3.0, preferably at least 4.0, and particularly preferably at least 5.0.

The cross-linked layer of the invention may be one or more of the layers selected from an electrically insulating layer, a semiconductor layer, a filler element and a protective sheath.

In the present invention, "electrically insulating layer" means a layer whose electrical conductivity may be at most $1 \cdot 10^{-9}$ S/m (siemens per metre) (at 25° C.).

In the present invention, "semiconductor layer" means a layer whose electrical conductivity may be greater than $1 \cdot 10^{-9}$ S/m (siemens per metre), preferably at least $1 \cdot 10^{-3}$ S/m, and preferably may be less than $1 \cdot 10^{3}$ S/m (at 25° C.).

When the cross-linked layer of the invention is a semiconductor layer, the polymer composition of the invention may comprise an electrically conductive filler in an amount sufficient to render the cross-linked layer of the invention semiconductor.

The electrical device of the invention may be an electrical cable or an electrical cable accessory. More particularly, the cross-linked layer may be intended to surround or may surround an elongated electrically conductive element.

According to a first embodiment, the electrical device according to the invention is an electrical cable comprising said cross-linked layer surrounding an elongated electrically conductive element.

The cross-linked layer of the invention can surround the elongated electrically conductive element in several variants.

According to a first variant, the cross-linked layer may be in direct physical contact with the elongated electrically conductive element. This first variant may be referred to as a low-voltage cable.

According to a second variant, the cross-linked layer may be at least one of the layers of an insulating system comprising:
- a first semiconductor layer surrounding the electrically conductive element,
- an electrically insulating layer surrounding the first semiconductor layer, and
- a second semiconductor layer surrounding the electrically insulating layer. This second variant may be referred to as a medium- or high-voltage cable.

According to a second embodiment, the electrical device according to the invention is an electrical cable accessory, said accessory comprising said cross-linked layer.

Said accessory is intended to surround an electrical cable, and preferably to surround at least one end of an electrical cable. The accessory may be, in particular, an electrical cable junction or termination.

The accessory can typically be a hollow longitudinal body, such as for example an electrical cable junction or termination, in which at least part of an electrical cable is intended to be positioned.

The accessory comprises at least one semiconductor element and at least one electrically insulating element, these elements being intended to surround one end of an electrical cable. The semiconductor element is well known for controlling the geometry of the electric field, when the electrical cable, associated with said accessory, is live.

The cross-linked layer of the invention may be said semiconductor element and/or said electrically insulating element of the accessory.

When the accessory is a junction, the latter makes it possible to connect two electrical cables together, the junction being intended to at least partially surround these two electrical cables. More particularly, the end of each electrical cable intended to be connected is positioned inside said junction.

When the device of the invention is an electrical cable termination, the termination is intended to at least partially surround an electrical cable. More particularly, the end of the electrical cable intended to be connected is positioned inside said termination.

When the electrical device is an electrical cable accessory, the cross-linked layer is preferably a layer moulded by techniques well known to the skilled person.

In the present invention, the elongated electrically conductive element of the electrical cable may be a metal wire or a plurality of metal wires, twisted or not, in particular made of copper and/or aluminium, or one of their alloys.

The cross-linked layer of the invention may be an extruded layer or a moulded layer, by processes well known to the skilled person. When the electrical device is an electrical cable, the cross-linked layer is preferably an extruded layer. When the electrical device is an electrical cable accessory, the cross-linked layer is preferably a moulded layer.

A further object of the invention relates to a process for manufacturing an electrical device of the electrical cable type according to the invention, characterized in that it comprises the following steps:

i. extruding the polymer composition around an elongated electrically conductive element, to obtain an extruded layer, and ii. cross-linking the extruded layer of step i.

Step i may be carried out using techniques well known to the skilled person, using an extruder.

In step i, the temperature within the extruder should preferentially not exceed the opening temperature of the epoxy function of the polymer, in order to avoid any cross-linking within the extruder.

The composition at the extruder outlet is therefore said to be "non-cross-linked", the temperature as well as the processing time in the extruder being optimized accordingly. By way of example, the extrusion processing temperature of the polymer composition is at most 160° C., and preferably at most 130° C.

"Non-cross-linked" means a layer with a measured $M_H$-$M_L$ value according to the standard ISO 6502 (2018) of less than 2.0, preferably less than 1.0, and preferably equal to 0.

At the extruder outlet, a layer is thus obtained which is extruded around said electrically conductive element, which may or may not be in direct physical contact with said electrically conductive element.

Prior to step i, the compounds constituting the polymer composition of the invention may be mixed, in particular with the polymer P in the molten state, in order to obtain a homogeneous mixture. The temperature within the mixer may be sufficient to obtain a polymer P in the molten state, but is limited to avoid cross-linking of the polymer P. The homogeneous mixture is then conditioned to feed an extruder to carry out step i.

Step ii may be carried out thermally, for example by means of a continuous vulcanisation (CV) line, a steam tube, a molten salt bath, a furnace or a thermal chamber, as these techniques are well known to the skilled person. By way of example, the cross-linking temperature may be below 300° C., and preferably less than or equal to 200° C.

At the extruder outlet, the composition extruded in the form of a layer around the electrically conductive element can then be subjected to a sufficient temperature and for a sufficient time to be able to react the cross-linking system of said invention. An extruded and cross-linked layer is then obtained.

Another object of the invention relates to a process for manufacturing an electrical device of the electrical cable accessory type, characterized in that it comprises the following steps:

a. moulding the polymer composition intended to surround an elongated electrically conductive element, to obtain a moulded layer, and b. cross-linking the moulded layer of step a.

Step a may be carried out by techniques well known to the skilled person, in particular by moulding or extrusion-moulding.

Step b may be carried out thermally, for example using a heated mould, which may be the mould used in step a.

The conditions mentioned above with the use of an extruder also apply for the use of a heated mould.

BRIEF DESCRIPTION OF THE DRAWINGS

Further features and advantages of the present invention will appear in the light of the description of a non-limiting example of an electrical cable according to the invention made with reference to the figures.

DETAILED DESCRIPTION

For the sake of clarity, only the elements essential for the understanding of the invention have been represented schematically, without respect to scale.

Figure 1:
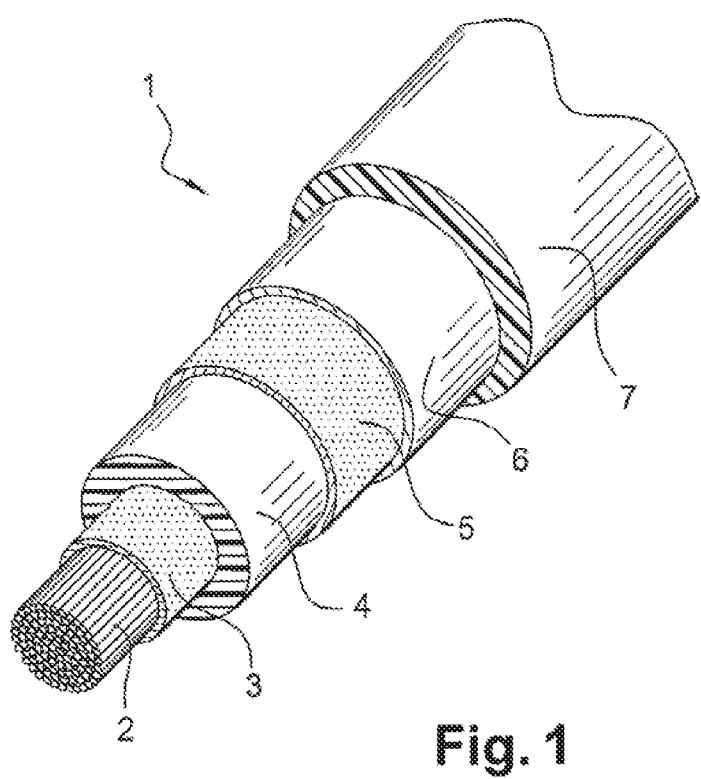
FIG. 1 shows a schematic cross-sectional view of an electrical cable according to a preferred embodiment in accordance with the invention.

The medium- or high-voltage power cable 1, shown in FIG. 1, consists of an elongated central conductive element 2, in particular made of copper or aluminium. The power cable 1 further comprises several layers arranged successively and coaxially around this conductive element 2, namely: a first semiconductor layer 3 known as the "inner semiconductor layer", an electrically insulating layer 4, a second semiconductor layer 5 known as the "outer semiconductor layer", a metallic earthing and/or protective shield 6, and an outer protective sheath 7.

The electrically insulating layer 4 is an extruded and cross-linked layer obtained from the polymer composition according to the invention.

The semiconductor layers are also extruded and cross-linked layers, which may be obtained from the polymer composition according to the invention.

The presence of the metal shield 6 and the outer protective sheath 7 is preferred, but not essential, as this cable structure as such is well known to the skilled person.

Figure 2:
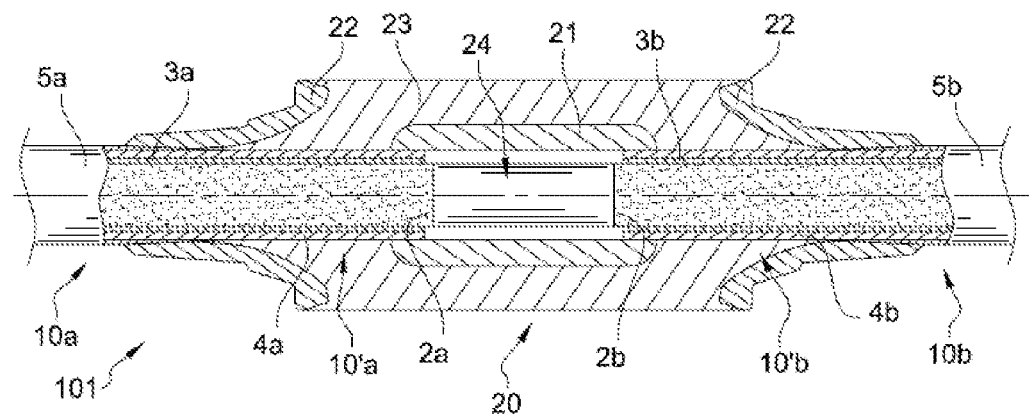
FIG. 2 shows a schematic view of an electrical device according to the invention, comprising a junction in longitudinal section, this junction surrounding the end of two electrical cables.

FIG. 2 shows a device 101 comprising a junction 20 partially surrounding two electrical cables 10a and 10b.

More particularly, the electrical cables 10a and 10b include an end 10'a and 10'b, respectively, intended to be surrounded by the junction 20.

The body of the junction 20 comprises a first semiconductor element 21 and a second semiconductor element 22, separated by an electrically insulating element 23, said semiconductor elements 21, 22 and said electrically insulating element 23 surround the ends 10'a and 10'b respectively of the electrical cables 10a and 10b.

This junction 20 allows the electrical connection of the first cable 10a to the second cable 10b, in particular thanks to an electrical connector 24 arranged in the centre of the junction 20.

At least one of the elements selected from the first semiconductor element 21, the second semiconductor element 22 and said electrically insulating element 23 may be a cross-linked layer as described in the invention.

The first electrical cable 10a comprises an electrical conductor 2a surrounded by a first semiconductor layer 3a, an electrically insulating layer 4a surrounding the first semiconductor layer 3a, and a second semiconductor layer 5a surrounding the electrically insulating layer 4a.

The second electrical cable 10b comprises an electrical conductor 2b surrounded by at least a first semiconductor layer 3b, an electrically insulating layer 4b surrounding the first semiconductor layer 3b, and a second semiconductor layer 5b surrounding the electrically insulating layer 4b.

These electrical cables 10a and 10b may be those described in the present invention.

At said end 10'a, 10'b of each electrical cable 10a, 10b, the second semiconductor layer 5a, 5b is at least partially stripped so that the electrically insulating layer 4a, 4b is at least partially positioned inside the junction 20, without being covered by the second semiconductor layer 5a, 5b of the cable.

Inside the junction 20, the electrically insulating layers 4a, 4b are in direct physical contact with the electrically insulating element 23 and the first semiconductor element 21 of the junction 20. The second semiconductor layers 5a, 5b are in direct physical contact with the second semiconductor element 22 of the junction 20.

Figure 3:
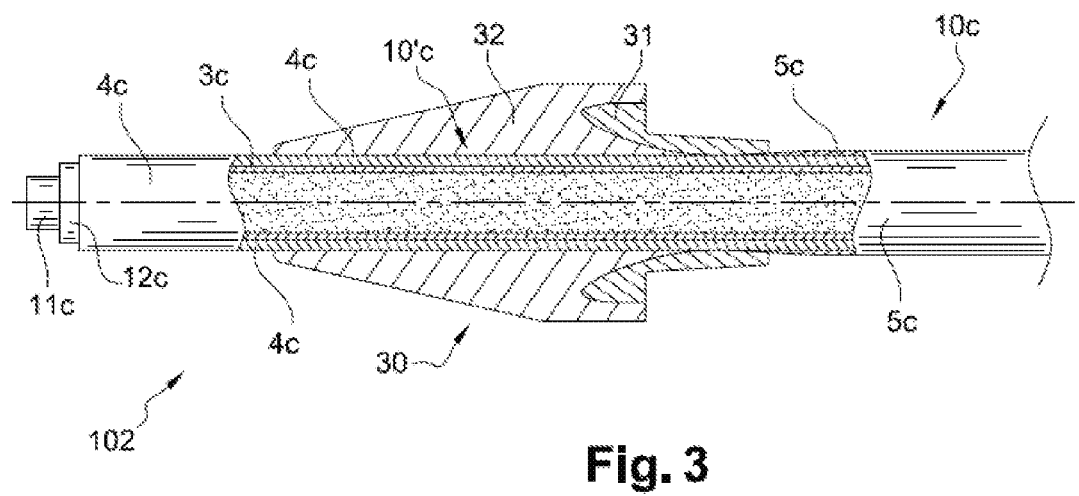
FIG. 3 shows a schematic view of an electrical device according to a first variant of the invention, comprising a termination in longitudinal section, this termination surrounding the end of a single electrical cable.

FIG. 3 shows a device 102 with a termination 30 surrounding a single electrical cable 10c.

More particularly, the electrical cable 10c has an end 10'c, intended to be surrounded by the termination 30.

The body of the termination 30 comprises a semiconductor element 31 and an electrically insulating element 32, said semiconductor element 31 and said electrically insulating element 32 surround the end 10'c of the electrical cable 10c.

At least one of the elements selected from the semiconductor element 31 and the electrically insulating element 32 may be a cross-linked layer as described in the invention.

The electrical cable 10c comprises an electrical conductor 2c surrounded by a first semiconductor layer 3c, an electrically insulating layer 4c surrounding the first semiconductor layer 3c, and a second semiconductor layer 5c surrounding the electrically insulating layer 4c.

This electrical cable 10c may be the one described in the present invention.

At said end 10'c of the electrical cable 10c, the second semiconductor layer 5c is at least partially stripped so that the electrically insulating layer 4c is at least partially positioned inside the termination 30, without being covered by the second semiconductor layer 5c of the cable.

Inside the termination 30, the electrically insulating layer 4c is in direct physical contact with the electrically insulating element 32 of the termination 30. The second semiconductor layer 5c is in direct physical contact with the semiconductor element 31 of the termination 30.

EXAMPLES

Tables 1 to 3 below list filled polymer compositions intended to be cross-linked, the amounts of which are expressed in parts by weight per hundred parts by weight of polymer(s) in the polymer composition.

Compositions C1 to C4 are comparative polymer compositions, and compositions I1 to I11 are polymer compositions in accordance with the invention.

These compositions comprise 100 parts by weight of a polymer P in accordance with the invention.

TABLE 1

| Polymer compositions | C1 | C2 | I1 | I2 | I3 | I4 | I5 |
|---|---|---|---|---|---|---|---|
| Polymer P | 100 | 100 | 100 | 100 | 100 | 100 | 100 |
| Flame-retardant filler | 140 | 140 | 140 | 140 | 140 | 140 | 140 |
| Additives | 9 | 9 | 9 | 9 | 9 | 9 | 9 |
| Cross-linking agent 1 | 0 | 0 | 1.00 | 0 | 1.00 | 1.00 | 1.00 |
| Cross-linking agent 2 | 0 | 0.50 | 0 | 0.50 | 0 | 0.50 | 0.50 |
| Cross-linking co-agent 1 | 0.70 | 0 | 0 | 0.70 | 0.70 | 0.70 | 0 |
| ts2 expressed in minutes | 11.59 | 8.33 | 2.29 | 3.85 | 1.98 | 1.83 | 2.08 |
| t90 expressed in minutes | 42.48 | 36.10 | 20.72 | 23.11 | 21.38 | 16.39 | 14.50 |
| $M_H - M_L$ expressed in dN·m | 4.84 | 5.37 | 5.64 | 6.44 | 5.98 | 6.00 | 5.73 |

TABLE 2

| Polymer compositions | C2 | C3 | I6 | I7 | I8 |
|---|---|---|---|---|---|
| Polymer P | 100 | 100 | 100 | 100 | 100 |
| Flame-retardant filler | 140 | 140 | 140 | 140 | 140 |
| Additives | 9 | 9 | 9 | 9 | 9 |
| Cross-linking agent 1 | 0 | 0 | 0 | 1.00 | 1.00 |
| Cross-linking agent 2 | 0.50 | 0 | 0.50 | 0 | 0.50 |
| Cross-linking co-agent 2 | 0 | 3.15 | 3.15 | 3.15 | 3.15 |
| ts2 expressed in minutes | 8.33 | — | 3.26 | 1.56 | 1.55 |
| t90 expressed in minutes | 36.10 | 54.14 | 9.15 | 6.45 | 6.20 |
| $M_H - M_L$ expressed in dN·m | 5.37 | 5.64 | 5.85 | 6.92 | 6.64 |

TABLE 3

| Polymer compositions | C2 | C4 | I9 | I10 | I11 |
|---|---|---|---|---|---|
| Polymer P | 100 | 100 | 100 | 100 | 100 |
| Flame-retardant filler | 140 | 140 | 140 | 140 | 140 |
| Additives | 9 | 9 | 9 | 9 | 9 |
| Cross-linking agent 1 | 0 | 0 | 0 | 1.00 | 1.00 |
| Cross-linking agent 2 | 0.50 | 0 | 0.50 | 0 | 0.50 |
| Cross-linking co-agent 3 | 0 | 5.00 | 5.00 | 5.00 | 5.00 |
| ts2 expressed in minutes | 8.33 | 37.79 | 3.18 | 2.03 | 2.06 |
| t90 expressed in minutes | 36.10 | 53.57 | 16.32 | 11.75 | 11.55 |
| $M_H - M_L$ expressed in dN·m | 5.37 | 3.08 | 8.64 | 9.82 | 9.09 |

The origin of the compounds in Tables 1 to 3 is as follows:
Polymer P is a copolymer of ethylene, vinyl acetate, glycidyl acrylate and glycidyl methacrylate (GMA), marketed by Denka under the name Denka ER 5300;
Flame-retardant filler is a metal hydroxide of the aluminium trihydroxide type;
Additives are processing agents;
Cross-linking agent 1 is a non-aromatic cyclic amine, in particular 1,4-diazabicyclo[2.2.2]octane, marketed by Merck under the name 1,4-diazabicyclo[2.2.2]octane (CAS No. 280-57-9);
Cross-linking agent 2 is an imidazole, in particular 1,2-dimethylimidazole marketed by Alfa Aesar under the name 1,2-dimethylimidazole (CAS No. 280-57-9);
Cross-linking co-agent 1 is an amino acid, in particular amino-11-undecanoic acid, marketed by SIGMA-ALDRICH under the name amino-11-undecanoic acid (CAS No. 2432-99-7);
Cross-linking co-agent 2 is a dicarboxylic acid in the form of a polymer, in particular polyethylene glycol diacid, marketed by Merck under the name Polyethylene glycol diacid 600; and Cross-linking co-agent 3 is a dicarboxylic acid, which is not in the form of a polymer, in particular dodecanedioic acid, marketed by SIGMA-ALDRICH under the name dodecanedioic acid (CAS No. 693-23-2).

The polymer compositions C1 to C4 and I1 to I11 were cross-linked under the same conditions.

In a first step, the compositions are prepared as follows: a master batch is prepared using an internal mixer with a volume of 1600 cm$^3$, with preheating to 60° C. and direct incorporation of the polymer P and part of the flame-retardant filler (about one third) to facilitate mixing.

Then the rest of the flame-retardant filler is added with the additives at a temperature sufficient to ensure homogeneous mixing of the composition (i.e. softening of the polymer P) without reacting the epoxies of the polymer P. By way of example, this temperature may be between 80 and 110° C., and may in particular be 105° C.

The addition of the cross-linking agent and/or cross-linking co-agent is then carried out at a temperature so as not to trigger cross-linking, such as for example at 40° C., using a roller mixer, then the polymer composition thus obtained is calendered to 3 mm to form a 3 mm-thick plate, and rheometric tests can then be carried out with a rheometer of the MDR2000 type marketed by Alpha Technologies.

In a second step, the cross-linking of the polymer composition is monitored by the rheometer for 60 min at 180° C. with an oscillation of 0.5°.

Tables 1 to 3 also show the results obtained after cross-linking of polymer compositions C1 to C4 and I1 to I11. These results relate to the onset of cross-linking (ts2) of the compositions, the cross-linking time (t90) of the compositions, and the cross-linking density ($M_H$-$M_L$) of the compositions.

The ts2 corresponds to the time after which, at a given measurement temperature, a value of $M_H$-$M_L$=2 dN·m is obtained. It is determined according to the standard ISO 6502 (2018) as described in the present invention. The measurement temperature for the values of the polymer compositions is 180° C.

The t90 is the time after which 90% of the $M_H$ value measured with the MDR is obtained at a given temperature, this temperature in the examples being 180° C. It is determined according to the standard ISO 6502 (2018) and may advantageously be less than 30 min, preferably not more than 25 min, preferably not more than 20 min, and particularly preferably not more than 15 min.

The cross-linking density is given by the measured value of $M_H$-$M_L$ according to the standard ISO 6502 (2018) with a moving die rheometer (MDR). This value is expressed in dN·m and represents the difference in torque measured by the moving die before and after complete formation of the cross-linking network in the polymer composition. The denser the three-dimensional network formed during cross-linking, the higher the $M_H$-$M_L$ value.

The invention claimed is:

1. An electrical device having at least one cross-linked layer obtained from an olefin polymer composition comprising:
   at least one olefin polymer comprising one or more epoxy function(s), and
   at least one cross-linking agent,
   wherein the cross-linking agent is
   a mixture of:
   an imidazole of formula (I)

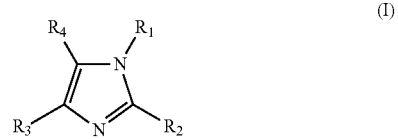

wherein $R_1$ and $R_2$ independently represent a hydrogen atom or a hydrocarbon group, $R_3$ and $R_4$ independently represent a hydrogen atom or a hydrocarbon group, or $R_3$ and $R_4$ form, together with the carbon atoms of the imidazole ring to which they are attached, a ring, wherein the polymer composition comprises no more than 0.5 parts by weight of imidazole of formula (I) per 100 parts by weight of polymer(s) in the polymer composition, a non-aromatic cyclic amine, wherein the polymer composition comprises no more than 1.0 parts by weight of non-aromatic cyclic amine per 100 parts by weight of polymer(s) in the polymer composition, and a cross-linking co-agent comprising at least one reactive function capable of reacting with the epoxy function of said polymer, said cross-linking co-agent selected from amino acid, a polymer carboxylic acid, and non-polymer carboxylic acid, wherein the polymer composition comprises no more than 0.7 parts by weight of cross-linking co-agent per 100 parts by weight of polymer(s) in the polymer composition if the cross-linking co-agent is the amino acid, wherein the polymer composition comprises no more than 3.15 parts by weight of cross-linking co-agent per 100 parts by weight of polymer(s) in the polymer composition if the cross-linking co-agent is the polymer carboxylic acid, wherein the polymer composition comprises no more than 5.0 parts by weight of cross-linking co-agent per 100 parts by weight of polymer(s) in the polymer composition if the cross-linking co-agent is the non-polymer carboxylic acid.

2. The electric device according to claim 1, wherein the device is an electrical cable comprising at least one elongated electrically conductive element, surrounded by said cross-linked layer.

3. The electric device according to claim 2, wherein the device comprises a first semiconductor layer surrounding the elongated electrically conductive element, an electrically insulating layer surrounding the first semiconductor layer, and a second semiconductor layer surrounding the electrically insulating layer, the cross-linked layer being at least one of these three layers.

4. The electric device according to claim 1, wherein the device is an electrical cable accessory, said accessory comprising at least said cross-linked layer.

5. The electric device according to claim 4, wherein the accessory is an electrical cable junction or termination.

6. The electric device according to claim 1, wherein the polymer comprises glycidyl ester groups.

7. The electric device according to claim 1, wherein the non-aromatic cyclic amine is a non-aromatic cyclic diamine.

8. The electric device according to claim 1, wherein the imidazole formula (I), $R_1$ represents an alkyl group having 1 to 20 carbon atoms; $R_2$ represents an alkyl group having 1 to 20 carbon atoms; and $R_3$ and $R_4$ represent hydrogen atoms.

9. The electric device according to claim 1, wherein the cross-linking co-agent comprises at least two reactive functions capable of reacting with the epoxy functions of said polymer.

10. The electric device according to claim 1, wherein the crosslinking co-agent is dodecanedioic acid.

11. The electric device according to claim 1, wherein the polymer composition further comprises at least one flame-retardant filler.

12. The electric device according to claim 1, wherein the cross-linked layer is an electrically insulating layer.

13. The electric device according to claim 1, wherein the cross-linked layer is a semiconductor layer.

* * * * *